United States Patent
Saito et al.

(10) Patent No.: US 6,710,301 B2
(45) Date of Patent: Mar. 23, 2004

(54) FLUX-CONTAINED WELDING WIRE

(75) Inventors: Teiichiro Saito, Hamakita (JP); Tadashi Ito, Hamakita (JP); Kazuo Tsujikawa, Himeji (JP); Toshio Yoshizawa, Hamakita (JP); Toshiaki Fujita, Hamamatsu (JP); Kanehisa Tanaka, Tenryu (JP)

(73) Assignee: Nippon Welding Rod Co., Ltd., Tokyo (JP)

( * ) Notice: Subject to any disclaimer, the term of this patent is extended or adjusted under 35 U.S.C. 154(b) by 0 days.

(21) Appl. No.: 10/196,815

(22) Filed: Jul. 17, 2002

(65) Prior Publication Data

US 2003/0052113 A1 Mar. 20, 2003

(30) Foreign Application Priority Data

Jul. 19, 2001 (JP) ........................................ 2001-220200

(51) Int. Cl.$^7$ .............................................. B23K 35/02
(52) U.S. Cl. .............................. 219/145.22; 219/146.23
(58) Field of Search ...................... 219/145.22, 146.23, 219/145.1, 146.1

(56) References Cited

U.S. PATENT DOCUMENTS

| | | | |
|---|---|---|---|
| 3,834,002 A | | 9/1974 | Sissons et al. |
| 4,149,063 A | * | 4/1979 | Bishel .................... 219/146.23 |
| 4,423,119 A | * | 12/1983 | Brown et al. ................ 428/558 |
| 4,449,031 A | * | 5/1984 | Kotecki .................. 219/146.23 |
| 5,225,661 A | * | 7/1993 | Chai et al. .............. 219/145.22 |
| 6,153,847 A | | 11/2000 | Nakatani et al. |

FOREIGN PATENT DOCUMENTS

| | | |
|---|---|---|
| BE | 675 192 | 5/1996 |
| DE | 195 23 400 A1 | 1/1997 |
| EP | 0 015746 | 5/1980 |
| FR | 2 158 621 | 6/1973 |
| FR | 2 177 134 | 11/1973 |
| GB | 1 383 304 | 2/1971 |

OTHER PUBLICATIONS

"Latest Welding Technology", Edition 2, 1982, p. 73. (English explanation attached).

* cited by examiner

Primary Examiner—M. Alexandra Elve
(74) Attorney, Agent, or Firm—Pearne & Gordon LLP

(57) ABSTRACT

A flux-contained welding wire is provided wherein a conductive core wire can be disposed without any complicate manufacturing steps performed on a metal outer layer. Flux is filled inside of the metal outer layer. The conductive core wire is disposed nearly in the center of the flux without being supported by the metal outer layer. The flux contains 20–80 weight % of metal powder. A weight % of the weight of the flux to the weight of the welding wire per unit length is set in a range of 6.5–30 weight %. The weight % of the weight of the conductive core wire to the weight of the welding wire per unit length is set in a range of 1.5–15 weight %.

10 Claims, 5 Drawing Sheets

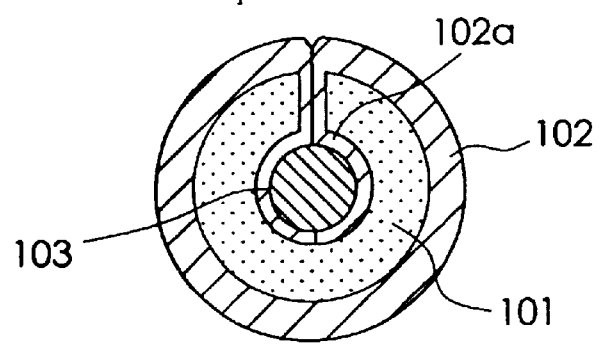

FLUX-CONTAINED WELDING WIRE

BACKGROUND OF THE INVENTION

The present invention relates to a welding wire containing a flux.

U.S. Pat. No. 6,153,847 discloses a welding wire containing a flux filled in the outer layer of a welding metal to improve mechanical properties, crack resistance, etc. of the welded metal. The flux contains various materials including a deoxidizer, a slag forming agent, an arc stabilizer and metal powder. In such a welding wire, since an arc occurs between the metal outer layer and a base material to be welded, the metal outer layer is first melted. For this reason, the flux located in the central portion of the outer layer cannot be melted sufficiently and thus the arc tends to be unstable. As a result, spatters tend to be easily generated with reduced work efficiency. Particularly, a welding wire made of Ni or an Ni-based alloy has such a problem, because the melting point of Ni or Ni-based alloy is lower than that of iron or the like. Further, the tubular outer layer is formed by rounding a plate metal material. If the thickness of the outer layer is larger than a predetermined value, the plate metal material cannot be formed into a tubular shape. For this reason, there is a limitation on reducing a flux filling space inside of the outer layer and thus the amount of flux content cannot be adjusted at a lower level. When the amount of the flux is increased to a level more than necessary, impurities included in the flux cause the welding metal to tend to crack. To avoid this, a structure was proposed wherein an electrically conductive core wire 103 supported by a support 102*a* integrally formed with a metal outer layer 102 is arranged nearly in the center of a flux 101, as shown on page 73 in a book entitled "Latest Welding Technology (Edition 2)" issued by Corona Publishing Co., Ltd., Japan, 1998, and written by Haruyoshi Suzuki (refer to FIG. 5). When the core wire 103 is disposed in the outer layer, an arc occurs between the core wire 103 and a base material to be welded and melting of the flux 101 is promoted, thus stabilizing the arc. Further, a flux filling space inside of the metal outer layer 102 can be decreased and thus cracking of the welded metal can be suppressed by suitably adjusting the amount of flux.

However, in order to support the core wire 103, such a welding wire requires complicated forming of the support 102*a* in the metal outer layer 102. In particular, when the diameter of the welding wire is 2.0 mm or less, the manufacturing steps become more complex.

SUMMARY OF THE INVENTION

It is therefore an object of the present invention to provide a welding wire containing a flux, in which an electrically conductive core wire made of Ni or Ni-based alloy can be disposed without the need for performing complicated manufacturing steps at a metal outer layer made of Ni or Ni-based alloy.

In accordance with an aspect of the present invention, a flux-contained welding wire is provided that includes a metal outer layer of a pipe shape made of Ni or Ni-based alloy, a flux filled inside of the metal outer layer, and an electrically conductive core wire made of Ni or Ni-based alloy and disposed inside of the metal outer layer together with the flux. In this case, the conductive core wire is disposed without being supported by the metal outer layer and such an amount of the metal powder is included in the flux as to reduce an electric resistance value between the metal outer layer and conductive core wire so that an arc can occur between the conductive core wire and a base material to be welded. In this context, the wording "without being supported by the metal outer layer" means that the conductive core wire is substantially separated from the metal outer layer, not being substantially connected to or engaged with the metal outer layer, for example, as shown in FIG. 5. However, a welding wire having the conductive core wire partly contacted with the metal outer layer is included in the scope of the present invention, because the conductive core wire is not mechanically or directly supported by the metal outer layer. In the present invention, electrical conduction between the metal outer layer and conductive core wire is realized by the flux metal powder of such an amount that can lower the electric resistance value between the metal outer layer and conductive core wire. As a result, even when the conductive core wire is arranged inside of the metal outer layer together with the flux without being supported by the metal outer layer, the electrical conduction of the conductive core wire with the metal outer layer via metal powder within the flux enables an arc to occur between the conductive core wire and a base material to be welded. The welding wire of the present invention can be manufactured more easily than the conventional welding wire which needs complicated manufacturing steps in order to support the conductive core wire by the outer layer. In particular, when the average outer diameter of the metal outer layer is 2.0 mm or less, great effect can be obtained by the present invention.

An amount of metal powder can be set to 20–80 weight % of granular metal powder per a weight of the flux in order to reduce the electric resistance value between the metal outer layer and conductive core wire to such a level that an arc can be generated between the conductive core wire and a base material to be welded. When the metal powder is of a granular type, the metal powder can be advantageously dispersed and mixed into the flux substantially homogeneously. When the amount of granular metal powder does not exceed 20 weight %, the conductivity between the metal outer layer and conductive core wire cannot be sufficiently increased by the flux and thus a sufficient arc cannot be generated between the conductive core wire and a base material to be welded. For this reason, the arc state becomes bad and spatters tend to be easily generated. Further, when the amount of metal powder exceeds 80 weight %, the necessary amount of non-metal flux such as an arc stabilizer is decreased. As a result, the arc state becomes bad and spatters tend to be easily generated.

When the weight % of the weight of the flux to the weight of the welding wire per unit length is set in a range of 6.5–30 weight %, the effect of the flux can be enhanced and cracking of the welded metal can be suppressed. When the weight % is less than 6.5 weight %, the effect of the flux acting to improve the mechanical properties, crack resistance, etc. of the welded metal cannot be obtained. When the weight % exceeds 30 weight %, the impurities contained in the flux tend to cause the welded metal to be easily cracked. Further, it is difficult to arrange the conductive core wire in the flux.

When the weight % of the weight of conductive core wire to the weight of the welding wire per unit length is set in a range of 1.5–15 weight %, the arc can be made stable and spatters tend to be less often generated. When the weight % is smaller than 1.5 weight %, the arc generation by the conductive core wire becomes insufficient with the result that an arc becomes unstable and spatters tend to be easily generated. When the weight % exceeds 15 weight %, the amount of the flux is limited and the necessary amount of non-metal flux such as an arc stabilizer is decreased. As a result, the arc state becomes bad and spatters tend to be easily generated.

As the main component of the metal powder included in the flux, Ni or Ni-based alloy powder can be employed.

The average particle diameter of the Ni or Ni-based alloy powder is preferably 10–100 μm. The average outer diameter of the metal outer layer is preferably not larger than 2.0 mm.

The conductive core wire may have various sectional shapes of polygon, circle, etc. When the conductive core wire has a sectional shape of a nearly circle, the arc state can be made good.

In the case of a specific flux-contained welding wire according to the present invention, the amount of metal powder included in the flux is 50–60 weight %, the weight % of the weight of the flux to the weight of the welding wire per unit length is 15.5–19.5 weight %, and the weight % of the weight of the conductive core wire to the weight of the welding wire per unit length is 3.5–7.5 weight %. When the amount of the metal powder and the weight % of the flux and core wire are set in the aforementioned value ranges, the most desirable effect of the flux can be obtained.

Other objects and further features of the present invention will be apparent from the following detailed description when read in conjunction with the accompanying drawings.

BRIEF DESCRIPTION OF THE DRAWINGS

FIG. 5 is a cross-sectional view of a prior art flux-contained welding wire.

DETAILED DESCRIPTION OF THE EMBODIMENTS

Embodiments of the present invention will be described in detail hereinafter referring to the accompanying drawings.

Figure 1:
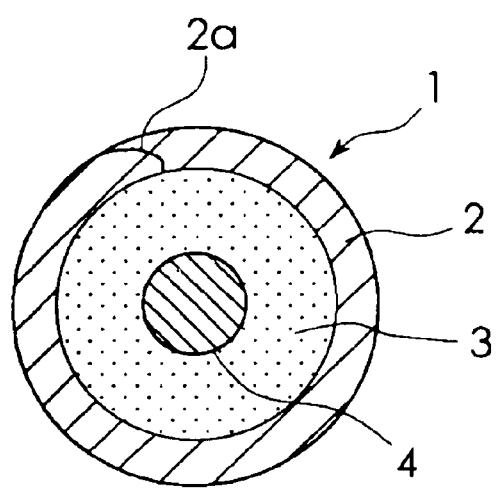
FIG. 1 is a cross-sectional view of a flux-contained welding wire for a test in accordance with an embodiment of the present invention.

FIG. 1 is a cross-sectional view of a flux-contained welding wire 1 used for tests shown in Table 1 below. As shown in the drawing, the flux-contained welding wire 1 comprises a metal outer layer 2, flux 3 filled inside of the metal outer layer 2, and a conductive core wire 4 disposed nearly in the center of the flux 3 without being supported by the metal outer layer 2. In comparative examples (C-EX) 1, 6 and 7 in Table 1, a conductive core wire is not provided, but the members other than the conductive core wire have the same structures as those in the above case. The metal outer layer 2 is made of Ni-based alloy of $YNiCr_3$, and the flux 3 has a mixture of $TiO_2$ and $Al_2O_3$. The flux 3 contains granular metal powder of Ni and Cr having average particle diameters of 10–100 μm. The conductive core wire 4 is made of Ni-based alloy of YNi-1 (Japanese Industrial Standard Z3334) and has a sectional shape of a circle.

Figure 2:
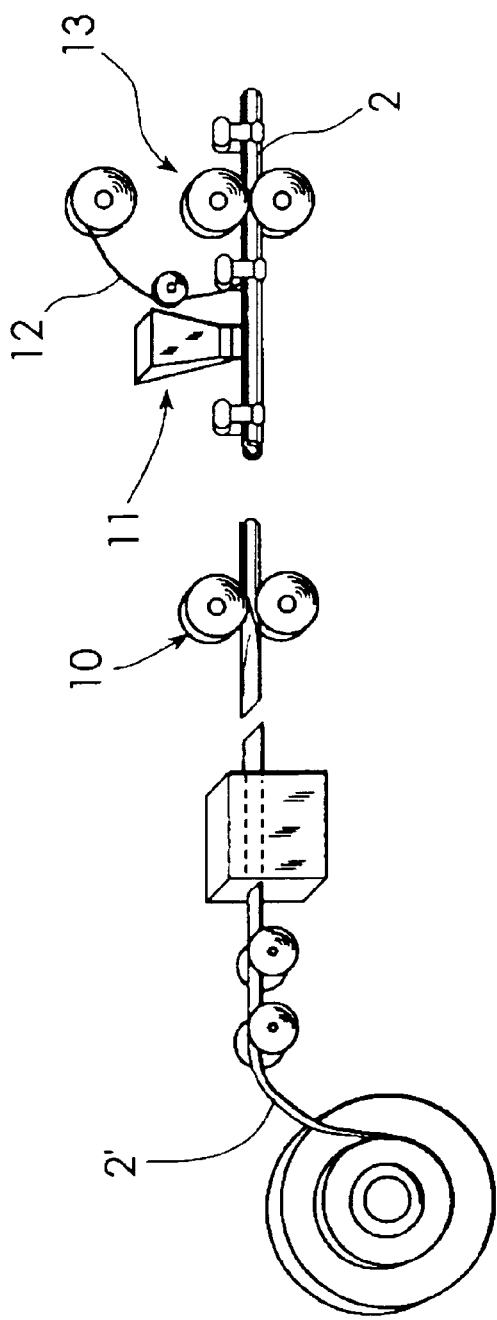
FIG. 2 is a diagram for explaining steps of manufacturing the flux-contained welding wire of FIG. 1.

Welding wires for tests were manufactured in the following manner. As shown in FIG. 2, a plate material 2' made of Ni-based alloy and having a width of 8 mm was first rounded by rounding rolls 10 into a U sectional shape (having an opening in its upper side), and then flux was filled into the U-shaped material from a flux filling device 11 and also a conductive core wire 12 was inserted thereinto. Then the U-shaped material was further subjected to additional rounding with use of closing rolls 13. As a result, such a lap portion 2a as shown in FIG. 1 was formed so that the metal outer layer 2 should become a cylindrical shaped material. Next the cylindrical shaped material was expanded into a welding wire having a diameter of 1.2 mm for each test. In this way, the welding wire can be easily manufactured without the need for making a construction for supporting the conductive core wire as in the prior art. In particular, when the diameter of the welding wire is made as small as 2.0 mm or less, the welding wire manufacturing can be facilitated. In this connection, each outer layer thickness (OLT) in Table 1 is the thickness of the plate material 2' prior to the rounding step, and the core wire diameter (CWD) is the diameter of each conductive core wire prior to the rounding step. These dimensions are decreased according to the rounding step. Each flux amount (FA) shown in Table 1 is the weight % of the weight of the flux to the weight of the welding wire per unit length, and each core wire amount (CWA) is the weight % of the weight of the conductive core wire to the weight of the welding wire per unit length. These flux amount (FA) and core wire amount (CWA) after the roll rounding steps were calculated on the basis of the weights of the metal outer layer, flux and conductive core wire prior to the roll rounding steps.

TABLE 1

| | OLT (mm) | CWD (mm) | MPA (wt %) | FA (wt %) | CWA (wt %) | CP (%) | WW arc | WW Spatter |
|---|---|---|---|---|---|---|---|---|
| C-EX. 1 | 0.4 | ncw | 60 | 20 | ncw | 100 | D | D |
| EM. 1 | 0.4 | 0.3 | 59.3 | 19.63 | 1.84 | 25 | C | B |
| C-Ex. 2 | 0.4 | 0.25 | 59.5 | 19.74 | 1.28 | 50 | D | D |
| EM.2 | 0.4 | 0.5 | 54.1 | 17.44 | 5.04 | 0 | A | A |
| EM.3 | 0.4 | 0.65 | 47.6 | 15.27 | 8.38 | 20 | B | B |
| EM.4 | 0.3 | 0.3 | 68.4 | 25.34 | 2.26 | 20 | C | B |
| C-EX. 3 | 0.2 | 0.25 | 73.6 | 30.35 | 2.19 | 100 | C | C |
| EM.5 | 0.4 | 0.75 | 50.9 | 14.86 | 10.31 | 30 | C | B |
| EM.6 | 0.4 | 0.65 | 31.2 | 13.38 | 8.08 | 10 | B | B |
| EM.7 | 0.4 | 0.5 | 54.26 | 17.44 | 5.04 | 0 | A | A |
| EM.8 | 0.4 | 0.8 | 45.73 | 14.64 | 12.17 | 20 | B | B |
| EM.9 | 0.4 | 0.9 | 44.06 | 14.18 | 14.93 | 15 | B | C |
| C-EX. 4 | 0.4 | 1.0 | 42.2 | 13.70 | 17.80 | 50 | E | D |
| EM.10 | 0.7 | 0.7 | 28.2 | 6.94 | 6.31 | 30 | C | B |
| C-EX. 5 | 0.4 | 0.5 | 0 | 12.35 | 5.35 | 100 | E | D |
| C-EX. 6 | 0.4 | ncw | 70 | 20.0 | ncw | 80 | D | D |
| EM.11 | 0.4 | 0.5 | 65.5 | 19.01 | 4.94 | 10 | A | A |
| EM.12 | 0.4 | 0.5 | 54.1 | 17.44 | 5.04 | 15 | A | B |
| EM.13 | 0.4 | 0.6 | 47.3 | 17.06 | 7.10 | 10 | B | B |
| C-EX. 7 | 0.4 | ncw | 79 | 20.0 | ncw | 55 | D | D |
| EM.14 | 0.4 | 0.5 | 75.9 | 17.44 | 5.04 | 0 | A | B |
| C-EX. 8 | 0.4 | 0.75 | 18.03 | 13.25 | 11.07 | 100 | E | D |
| C-EX. 9 | 0.4 | 0.5 | 85.7 | 17.44 | 5.04 | 100 | E | E |

Figure 3:
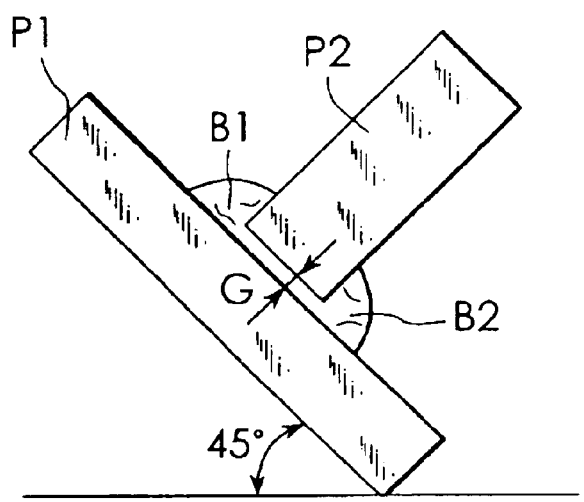
FIG. 3 is a diagram for explaining how the flux-contained welding wire of FIG. 1 is subjected to a T-shaped weld cracking test.

OLT outer layer thickness prior to the rounding steps
CWD core wire diameter prior to the rounding steps
MPA metal powder amount (wt % in flux)
FA flux amount after the rounding steps (to welding wire wt %)
CWA core wire amount after the rounding steps (to welding wire wt %)
CP cracking percentage
WW welding workability
EM. embodiment
C-EX. comparative example
ncw no core wire Next a T-shaped weld cracking test was conducted with use of these test welding wires. The present test was basically based on the JIS-Z-3153 (1993) T-shaped weld cracking test. More specifically, as shown in FIG. 3, two plates (base materials to be welded) P1 and P2 made of SM490A are welded into a T shape with a gap G of 1 mm provided therebetween and with test bead B1 and restriction bead B2 formed thereon, and a cracking length of the test bead B1 and crater portion is found by a dye penetrative test to calculate a cracking percentage ((crack length divided by crater length) multiplied by 100). In this connection, welding conditions were set at a current of 200–210A, a voltage of 29–30V, the welding rate of the test bead of 300 mm/min., and the welding rate of the restriction bead of 250 mm/min. Further, since cracking occurred only in the crater portion, only the cracking of the crater portion was examined. The test results are shown in Table 1. It will be seen from Table 1 that the crack percentage is high in the welding wires of comparative examples (C-EX) 1, 6 and 7 having no conductive core wires and in the welding wire of a comparative example 3 having the flux amount (weight % of the weight of the flux to the weight of the welding wire per unit length) exceeding 30 weight %. This is considered to result from the fact that the increased flux amount causes cracking to take place due to impurities-contained in the flux. It will also be seen that the crack percentage is high even in the welding wires of comparative examples 5 and 8 having a metal powder content not exceeding 20 weight % in the flux. This is considered to result from the fact that the electrical conduction to the conductive core wire is insufficient and thus the arc becomes unstable. It will also be observed that that the crack percentage is high even in the welding wire of comparative example 9 having a metal powder content exceeding 80 weight % in the flux. This is considered to result from the fact that the necessary amount of non-metal flux such as an arc stabilizer is decreased.

Next a bead was formed on the surface of a plate of 12×100×250 mm made of SM490A to extend in a longitudinal direction thereof. Arc state (strong or weak arc, continuity, etc. of the arc) was visually observed, and rated on a five-level scale of A, B, C, D and E in the better order of the quality. Spatter state was evaluated on the basis of the size and number of generated spatters in a five step levels of A, B, C, D and E in the better order of the quality. More concretely, the evaluation criterion was based on the number of deposited spatters per 150 mm of welded bead center so that A is 0–1, B is 2–5, C is 6–10, D is 11–25 and E is 26 or more. Its test results are given in Table 1. It will be seen from Table 1 that the arc state is bad and spatters tend to be easily generated in the welding wires of the comparative examples 1, 6 and 7 having no conductive core wire provided therein. This is because, in the welding wire having no conductive core wire, the arc takes place between the metal outer layer and a base material to be welded and thus the metal outer layer is first melted and the central portion of the flux cannot be sufficiently melted. As a result, the arc becomes unstable and spatters tend to easily occur. It will also be noted that, even in the welding wire of the comparative example 2 having a core wire amount (weight % of the weight of the conductive core wire to the weight of the core per unit length) not exceeding 1.5 weight %, the arc state is bad and spatters tend to easily occur. This is because the core wire amount is small and thus the arc generation is insufficient at the conductive core wire. It will further be noted that, even in the welding wire of the comparative example 4 having a core wire amount exceeding 15 weight %, the arc state is bad and spatters tend to easily occur. This is because the flux amount is limited so that the necessary amount of non-metal flux such as an arc stabilizer is decreased. It will be understood that, even in the welding wires of the comparative examples 5 and 8 having a metal powder content smaller than 20 weight % in the flux, the arc state is bad and spatters tend to be easily generated. This is because the flux metal powder content is small, and thus the sufficient electrical conduction between the metal outer layer and conductive core wire cannot be realized and the arc generation in the conductive core wire becomes insufficient. It will also be observed that, even in the welding wire of the comparative example 9 having a flux metal powder content exceeding 80 weight %, the arc state is bad and spatters tend to be easily generated. This is because the necessary amount of the non-metal flux such as an arc stabilizer is decreased.

Then the flux metal powder content and the relation between the metal outer layer and conductive core wire were examined. Welding wires of 1.2 mm in diameter having a metal outer layer of 0.5 mm in thickness and 8 mm in width and having flux and a conductive core wire of 0.5 mm in diameter surrounded by the metal outer layer were made, and electric resistance values of the welding wires per 50 cm were examined when the flux metal powder content was changed in various levels. The results are given in Table 2. In this case, the electric resistance value is proportional to the electric resistance value between the metal outer layer and conductive core wire.

TABLE 2

| metal component in flux (wt %) | resistance value (Ω/50 cm) |
| --- | --- |
| 0 | 0.763 |
| 18 | 0.673 |
| 20.5 | 0.462 |
| 28.2 | 0.433 |
| 54.1 | 0.392 |
| 65.5 | 0.402 |
| 79.5 | 0.388 |
| 85.7 | 0.390 |

It will be seen from Table 2 that when the flux metal powder content is 20–80 weight %, the electric resistance value is low and the electrical conduction between the metal outer layer and conductive core wire can be increased. In this connection, when the flux metal powder content exceeds 80 weight %, the electric resistance value is low. However since the necessary amount of non-metal flux such as an arc stabilizer is decreased, the arc state becomes bad and spatters tend to be easily generated.

Figure 4A:
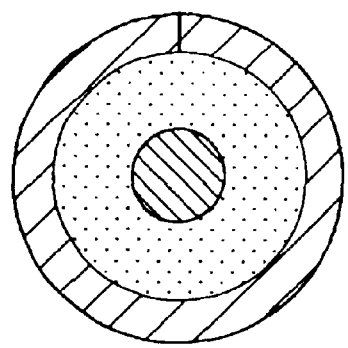
FIGS. 4A, 4B and 4C show cross-sectional views of flux-contained welding wires in accordance with other embodiments of the present invention.
Figure 4B:
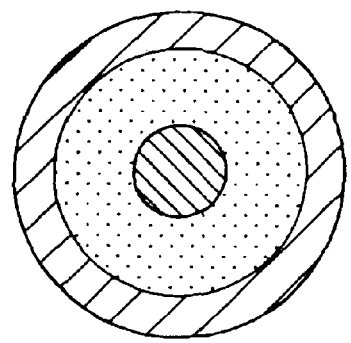
Figure 4C:
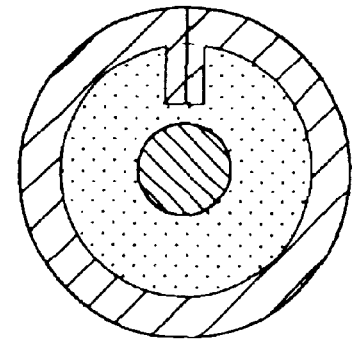

In the present embodiment, the present invention has been applied to the flux-contained welding wire of the lap type having a lap portion $2a$ formed therein. However, it goes without saying that the present invention can be applied to a welding wire of an abut O type wherein ends of the metal outer layer are not overlapped but abut as joined to each other as shown in FIG. 4A, a welding wire of a seamless type as shown in FIG. 4B, and a welding wire of a T type as shown in FIG. 4C.

Although granular powder has been used as the flux metal powder in the present embodiment, powder of any other particle shapes including flake or line can be employed.

In addition, though the sectional shape of the conductive core wire has been a circle in the present embodiment, any other sectional shape such as a polygon may be used.

In accordance with the present invention, by including in the flux such an amount of metal powder as to able to reduce the electric resistance value between the metal outer layer and conductive core wire, the electrical conduction between the metal outer layer and conductive core wire can be realized. Therefore, even when the conductive core wire is disposed inside of the metal outer layer together with the flux without being supported by the metal outer layer, the electrical conduction of the conductive core wire with the metal outer layer via the flux enables generation of the arc between the conductive core wire and a base material to be welded. For this reason, the welding wire can be easily manufactured without the need for performing complicated manufacturing steps at the metal outer layer for the purpose of supporting the conductive core wire as in the prior art. In particular, when the average outer diameter of the metal outer layer is made as small as 2.0 mm or less, the welding wire manufacturing can be facilitated.

What is claimed is:

1. A flux-contained welding wire comprising: a metal outer layer of a pipe shape made of Ni or Ni-based alloy; a flux filled inside of said metal outer layer; and a conductive core wire made of Ni or Ni-based alloy and disposed inside of the metal outer layer together with said flux without being supported by said metal outer layer, wherein said flux includes metal powder of such an amount as to reduce an electric resistance value between said metal outer layer and said conductive core wire so that an arc can occur between said conductive core wire and a base material to be welded.

2. A flux-contained welding wire comprising: a metal outer layer of a pipe shape made of Ni or Ni-based alloy; a flux filled inside of said metal outer layer; and a conductive core wire made of Ni or Ni-based alloy and disposed inside of the metal outer layer together with said flux without being supported by said metal outer layer, wherein said flux contains 20–80 weight % of granular metal powder per a weight of said flux, a weight % of the weight of said flux to a weight of said welding wire per unit length is set in a range of 6.5–30 weight %, and a weight % of a weight of said conductive core wire to the weight of said welding wire per unit length is set in a range of 1.5–15 weight %.

3. The flux-contained welding wire as set forth in claim 2, wherein a main component of said metal powder included in said flux is Ni or Ni-based alloy powder.

4. The flux-contained welding wire as set forth in claim 3, wherein said Ni or Ni-based alloy powder has an average particle diameter of 10–100 $\mu$m.

5. The flux-contained welding wire as set forth in claim 3, wherein said metal outer layer has an average outer diameter of 2.0 mm or less.

6. The flux-contained welding wire as set forth in claim 3, wherein said conductive core wire has a substantially circular sectional shape.

7. The flux-contained welding wire as set forth in claim 5, wherein said metal outer layer has an overlapped portion.

8. A flux-contained welding wire comprising: a metal outer layer made of Ni or Ni-based alloy and having an average outer diameter not larger than 2.0 mm, a flux filled inside of said metal outer layer; and a conductive core wire made of Ni or Ni-based alloy and disposed substantially in a center of said flux without being supported by said metal outer layer, wherein said flux contains 50–60 weight % of Ni or Ni-based alloy metal powder per a weight of said flux, which has an average particle diameter of 10–10 $\mu$m, a weight % of a weight of said flux to a weight of said welding wire per unit length is set in a range of 15.5–19.5 weight %, and a weight % of a weight of said conductive core wire to the weight of said welding wire per unit length is set in a range of 3.5–7.5 weight %.

9. The flux-contained welding wire as set forth in claim 8, wherein said conductive core wire has a substantially circular sectional shape.

10. The flux-contained welding wire as set forth in claim 8, wherein said metal outer layer has an overlapped portion.

* * * * *

UNITED STATES PATENT AND TRADEMARK OFFICE
CERTIFICATE OF CORRECTION

PATENT NO.    : 6,710,301 B2
DATED         : March 23, 2004
INVENTOR(S)   : Teiichiro Saito et al.

It is certified that error appears in the above-identified patent and that said Letters Patent is hereby corrected as shown below:

Column 3,
Line 2, please delete "had", and insert therefore -- bad --.

Column 8,
Line 23, please delete "10-10 $\mu$m", and insert therefor -- 10-100 $\mu$m --.

Signed and Sealed this

First Day of November, 2005

JON W. DUDAS
*Director of the United States Patent and Trademark Office*